US000002034H

(19) United States

(12) Statutory Invention Registration

Hopkins

(10) Reg. No.: US H2034 H

(43) Published: Jul. 2, 2002

(54) INSTRUMENTATION SPARK PLUG

(75) Inventor: Mark F. Hopkins, Winter Park, FL (US)

(73) Assignee: The United States of America as represented by the Secretary of the Air Force, Washington, DC (US)

(21) Appl. No.: 09/046,005

(22) Filed: Mar. 23, 1998

(51) Int. Cl.[7] ..... G01J 5/00

(52) U.S. Cl. ..... 374/121

(58) Field of Search ..... 374/121, 141, 374/144, 124; 73/35, 115, 116

(56) References Cited

U.S. PATENT DOCUMENTS

| | | | | | |
|---|---|---|---|---|---|
| 4,393,687 | A | * | 7/1983 | Muller et al. | 73/35 |
| 4,425,788 | A | * | 1/1984 | Franke et al. | 73/35 |
| 4,446,723 | A | * | 5/1984 | Boning et al. | 73/35 |
| 4,514,656 | A | * | 4/1985 | Damson et al. | 313/11.5 |
| 5,033,434 | A | * | 7/1991 | Britton | 123/425 |
| 5,463,222 | A | * | 10/1995 | Lesko | 374/144 |
| 5,659,133 | A | * | 8/1997 | Sims et al. | 73/116 |
| 5,714,680 | A | * | 2/1998 | Taylor et al. | 73/115 |
| 5,754,715 | A | * | 5/1998 | Melling | 385/12 |
| 5,763,769 | A | * | 6/1998 | Kluzner | 73/115 |
| 5,841,546 | A | * | 11/1998 | Carangelo et al. | 356/445 |
| 5,895,927 | A | * | 4/1999 | Brown | 250/559.19 |

OTHER PUBLICATIONS

J.P. Dakin, D.A. Kahn, A novel fibre–optic temperature probe, Optical and quantum electronics 9, 538–544, Jul. 1977.*

* cited by examiner

*Primary Examiner*—Daniel T. Pihulic

(74) *Attorney, Agent, or Firm*—Bobby D. Scearce; Thomas L. Kundert

(57) ABSTRACT

A spark plug system for measuring the thermal profile across the surface of a piston in an operating internal combustion engine in characterizing the combustion process within a combustion chamber of the engine is described that includes a specially constructed spark plug containing a coherent fiber optic bundle and lens system optically connected to a remote sensing thermometer and high-speed triggerable imaging infrared video camera.

12 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INSTRUMENTATION SPARK PLUG

RIGHTS OF THE GOVERNMENT

The invention described herein may be manufactured and used by or for the Government of the United States for all governmental purposes without the payment of any royalty.

BACKGROUND OF THE INVENTION

The present invention relates generally to systems and methods for the diagnostic testing of internal combustion engines and more particularly to an instrumented spark plug useful for optically viewing the interior of a combustion chamber of an operating internal combustion engine.

The invention provides an instrumented spark plug system for measuring the thermal profile across a piston surface within an internal combustion engine during normal operation, and includes a coherent optical fiber bundle contained within a specially constructed spark plug, and lens system optically connected to a high speed triggerable imaging infrared (IR) video camera. The system images the piston surface onto the face of the optical fiber bundle in near real time and transmits the images to the video camera, thereby obtaining spot temperature measurements at each engine cycle.

It is therefore a principal object of the invention to provide an instrumented spark plug.

It is another object of the invention to provide a system for the diagnostic testing of an internal combustion engine.

It is a further object of the invention to provide a system for obtaining temperature profile information on a piston within an operating internal combustion engine.

It is a further object of the invention to provide an instrumented spark plug for diagnostic testing of an internal combustion engine.

These and other objects of the invention will become apparent as a detailed description of representative embodiments proceeds.

SUMMARY OF THE INVENTION

In accordance with the foregoing principles and objects of the invention, a spark plug system for measuring the thermal profile across the surface of a piston in an operating internal combustion engine in characterizing the combustion process within a combustion chamber of the engine is described that includes a specially constructed spark plug containing a coherent fiber optic bundle and lens system optically connected to a high-speed triggerable imaging infrared video camera.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
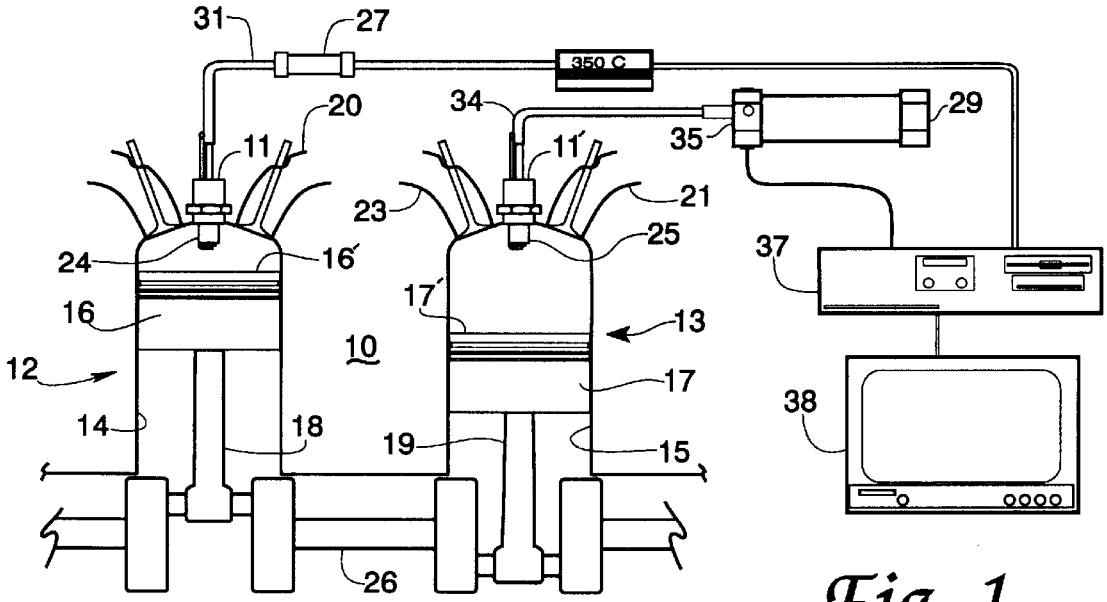
FIG 1 shows schematically two cylinders of an internal combustion engine and placement of the instrumented spark plug and associated equipment of the invention.

In the drawings, FIG. 1 shows schematically two adjacent or complementary cylinders 12,13 of an internal combustion engine 10 (e.g. cylinders 1 and 4 of a conventional eight-cylinder gasoline engine), cylinders 12,13 being equipped with instrumented spark plugs 11,11' of the invention. Cylinders 12,13 typically include respective combustion chambers 14,15, pistons 16,17, piston rods 18,19, fuel intake ports 20,21, exhaust ports 22,23, spark plug wells 24,25 and cam 26 operatively connected to rods 18,19. In the representative system of the invention of FIG. 1, two separate embodiments are presented for temperature observation of surfaces 16',17' of pistons 16,17.

In FIG. 1, incoherent fiber optic bundle 31 operatively connects plug 11 on cylinder 12 to the sensor head of spot temperature sensor 27 (commercially available remote sensing thermometer) for measuring the temperature of a spot on surface 16' of piston 16. Coherent fiber optic bundle 34 connects plug 11' on cylinder 13 to relay optical system 35 and IR imaging radiometric temperature sensor 29 (e.g. platinum silicide IR video camera) for imaging surface 17' of piston 17 and producing a temperature profile across surface 17'. Any suitably temperature resistant fiber optic bundle may be used as selected by one skilled in the applicable art guided by these teachings, an arsenic-selenium-tellurium imaging fiber bundle operating at wavelengths of about 3–5 microns ($\mu$m) being preferred and included in a system built and operated in demonstration of the invention. Fiber bundle 31 in the demonstration system was about one meter long with individual fibers having a 125 $\mu$m diameter core and 10 $\mu$m thick cladding, giving fiber-to-fiber spacing of about 135 $\mu$m.

Conventional personal computer 37 may provide means for controlled temperature data acquisition and image capture for displaying the imagery on monitor 38. Measurements may be made at any selected position of the piston 16,17 strokes using triggering off cam 26.

Figure 2:
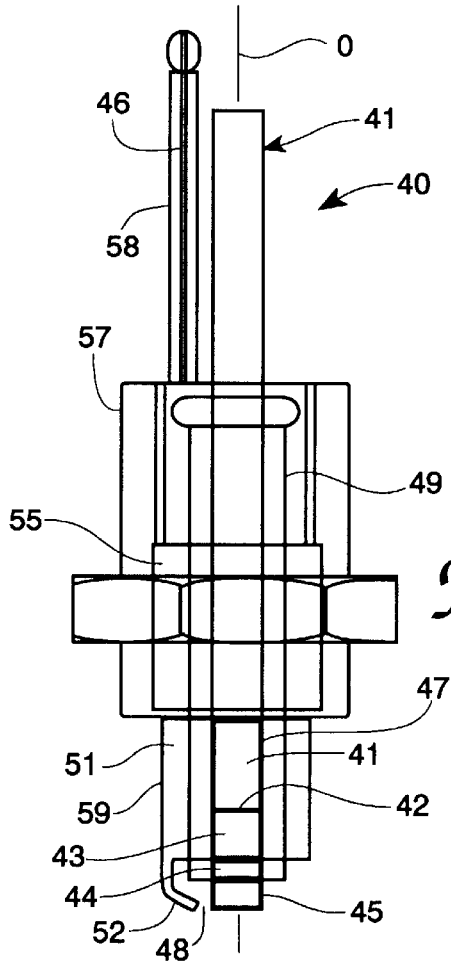
FIG. 2 is a view in axial section of a spark plug of the FIG. 1 system.

Referring now to FIG. 2, shown therein is a view in axial section of an instrumented spark plug 40, similar in structure to plugs 11,11' of FIG. 1, representative of the invention. For optimum operation of the invention, plug 40 should be structured for operating as a normal spark plug but be capable also of relaying the maximum practical optical energy characterizing the piston surface. Plug 40 therefore includes a central coherent optical fiber bundle 41 having at first end 42 thereof one or more imaging lenses 43,44 and an optical window 45 of sapphire, diamond, zinc selenide or other suitable temperature resistant optical material transparent to the wavelength range of interest (3–5 $\mu$m). Lenses 43,44, fiber bundle 41 and window 45 are all axially aligned central of the structure of plug 40 in order to minimize effects of engine vibration and reflection losses. Fiber bundle 41 is surrounded by electrically conducting tube 47 serving as a charge carrier (cathode) to spark gap 48. Fiber bundle 41 and conducting tube 47 are surrounded by tubular ceramic insulator 49 composed of any suitable material customarily used in conventional spark plug construction. Typical dielectric strengths of extruded type ceramics useful for insulator 49 range from about 400 to 800 volts/mil and the spark plug generates up to about 30,000 volts under full load. Insulator 49 is therefore about 80 mils thick for adequate insulation. Insulator 49 separates tube (cathode) 47 of plug 40 from the main body (anode) 51 which terminates in tip 52 and defines spark gap 48 between tip 52 and tube 47. Spark gap 48 is disposed to one side of optical axis O along which fiber bundle 41, lenses 43,44 and window 45 are disposed, which allows line-of-sight measurement of the surface of the piston (not shown in FIG. 2) within its combustion chamber. Water jacket 55 may be included in the structure of plug 40 as suggested in FIG. 2 and operatively connected to a source (not shown) of coolant water to avoid overheating of plug 40 constituent parts from engine heat during operational use of the invention. Thermally insulating outer shells 57,58 of material such as DELRIN®, any suitable ceramic, or the like may be included to insulate cathode 46 and conducting tube 47 from engine heat. Means such as threads 59 may be included on the outer surface of plug 40 so that plug 40 may be received by engine 1O as suggested in FIG. 1.

Figure 3:
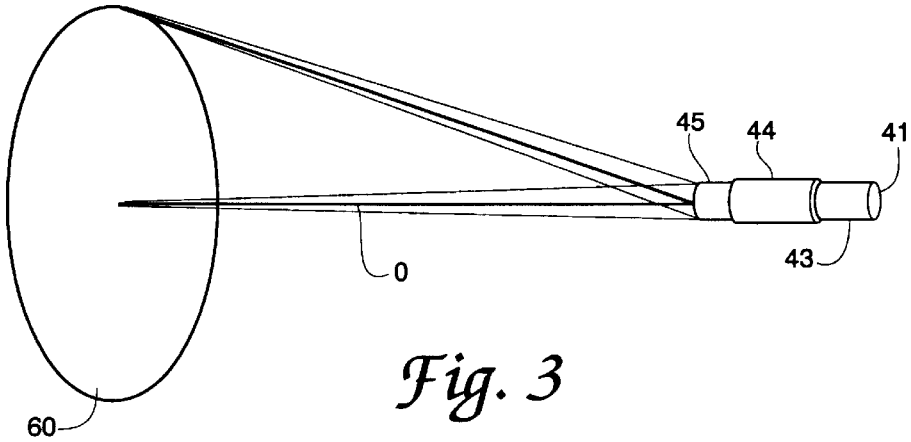
FIG. 3 is a schematic of representative imaging optics for imaging a piston surface onto the coherent fiber optic array of the system of FIGS. 1 and 2.
Figure 4:
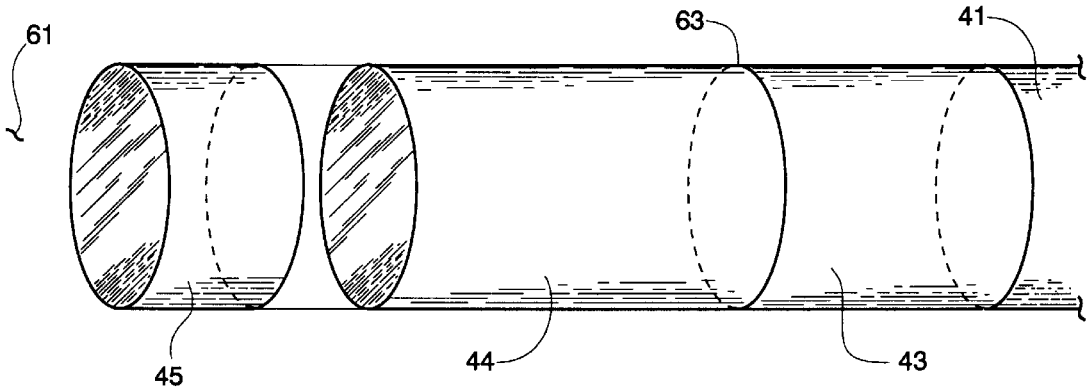
FIG. 4 is an enlarged view of the imaging optics of FIG. 3.

The size of a standard spark plug requires that the instrumented plug of the invention include miniature lenses 43,44 for transmitting an image of the piston surface into fiber bundle (41, FIG. 2). Lens requirements for the instrumented plug may be determined using a PC based lens design program such as ZEMAX (mfgd by Focus Software, Inc.). FIGS. 3 and 4 are schematic illustrations of representative two-lens imaging optics suitable for imaging a surface 60 of a piston onto the optical fiber bundle 41 of the invention. Optical window 45 (nominally 1 inch thick sapphire) protects imaging lenses 43,44 from the heat of combustion chamber 61. Lenses 43,44 are nominally about 6 mm in diameter in order to accommodate size restrictions imposed on plug 40, and may comprise any suitable materials as would occur to the skilled artisan guided by these teachings, such as germanium or zinc selenide as illustrated in FIG. 4. Lenses 43,44 are cemented together and fiber bundle 41 is cemented to the back side of lens 44 as suggested in FIG. 4 using conventional IR index matching cement 63. The first (input) surface of lens 43 serves as the stop and may preferably have an antireflection coating . Lenses 43,44 correct some field curvature, coma, astigmatism and spherical aberrations and image the scene onto the input surface of fiber bundle 41.

The invention therefore provides an instrumentation spark plug for viewing the combustion process within a combustion chamber of an internal combustion engine. It is understood that modifications to the invention may be made to the invention as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A spark plug system for measuring the thermal profile across the surface of a piston in an operating internal combustion engine, comprising:

(a) an optical fiber having first and second ends disposed along an optical axis;

(b) an imaging lens disposed at said first end of said optical fiber and axially aligned therewith for transmitting along said optical fiber an image of a surface of a piston within an operating internal combustion engine;

(c) a temperature resistant substantially optically transparent optical window on said imaging lens for protecting said imaging lens from heat within the engine;

(d) an electrically conducting tube surrounding said optical fiber, imaging lens and optical window near said first end of said optical fiber, said tube comprising a first electrode;

(e) a tubular ceramic insulator surrounding said conducting tube;

(f) means defining a second electrode external of said tubular ceramic insulator, said second electrode terminating at one end thereof near said first end of said optical fiber and defining a spark gap between said second and first electrodes near said first end of said optical fiber;

(g) means external of said second electrode for engaging a spark plug well of the engine; and (h) means operatively connected to said second end of said optical fiber for controlled temperature data acquisition and image capture for displaying images of said piston surface transmitted by said optical fiber.

2. The system of claim 1 wherein said optical window comprises a material selected from the group consisting of sapphire, diamond and zinc selenide transparent to optical wavelengths in the range of about 3 to 5 microns.

3. The system of claim 1 wherein said optical fiber comprises an arsenic-selenium-tellurium imaging fiber bundle for operation at wavelengths of about 3–5 microns.

4. The system of claim 1 wherein said imaging lens comprise a material selected from the group consisting of germanium and zinc selenide.

5. The system of claim 4 further comprising an antireflection coating on said imaging lens.

6. A spark plug system for measuring the thermal profile across the surface of a piston in an operating internal combustion engine, comprising:

(a) an optical fiber having first and second ends disposed along an optical axis;

(b) an imaging lens disposed at said first end of said optical fiber and axially aligned therewith for transmitting along said optical fiber an image of a surface of a piston within an operating internal combustion engine;

(c) a temperature resistant optical window on said imaging lens for protecting said imaging lens from heat within the engine, said optical window being substantially transparent to optical wavelengths in the range of 3 to 5 microns;

(d) an electrically conducting tube surrounding said optical fiber, imaging lens and optical window near said first end of said optical fiber, said tube comprising a first electrode;

(e) a tubular ceramic insulator surrounding said conducting tube;

(f) means defining a second electrode external of said tubular ceramic insulator, said second electrode terminating at one end thereof near said first end of said optical fiber and defining a spark gap between said second and first electrodes near said first end of said optical fiber; and (g) thread means external of said second electrode for threadably engaging a spark plug well of the engine.

7. The system of claim 6 further comprising an imaging radiometric temperature sensor operatively connected to said second end of said optical fiber for imaging the surface of the piston.

8. The system of claim 6 further comprising a remote sensing thermometer operatively connected to said second end of said optical fiber for measuring the temperature of the surface of the piston.

9. The system of claim 6 wherein said optical window comprises a material selected from the group consisting of sapphire, diamond and zinc selenide.

10. The system of claim 6 wherein said optical fiber comprises an arsenic-selenium-tellurium imaging fiber bundle for operation at wavelengths of about 3–5 microns.

11. The system of claim 6 wherein said imaging lens comprises a material selected from the group consisting of germanium and zinc selenide.

12. The system of claim 11 further comprising an antireflection coating on said imaging lens.

* * * * *